United States Patent [19]

Levendis et al.

[11] Patent Number: 5,426,936
[45] Date of Patent: Jun. 27, 1995

[54] DIESEL ENGINE EXHAUST GAS RECIRCULATION SYSTEM FOR $NO_x$ CONTROL INCORPORATING A COMPRESSED AIR REGENERATIVE PARTICULATE CONTROL SYSTEM

[75] Inventors: Yiannis A. Levendis, Boston; Richard F. Abrams, Westboro, both of Mass.

[73] Assignees: Northeastern University, Boston; Ceramem Corporation, Waltham, both of Mass.

[21] Appl. No.: 78,972

[22] Filed: Jun. 17, 1993

Related U.S. Application Data

[63] Continuation-in-part of Ser. No. 839,171, Feb. 21, 1992, Pat. No. 5,253,476.

[51] Int. Cl.⁶ .................. F01N 3/02; F02M 25/06
[52] U.S. Cl. .................. 60/278; 60/279; 60/288; 60/311; 55/302; 55/DIG. 30
[58] Field of Search ............ 60/279, 278, 288, 311; 55/302, DIG. 30

[56] References Cited

U.S. PATENT DOCUMENTS

| | | | |
|---|---|---|---|
| 4,220,632 | 9/1980 | Pence et al. | 423/239 |
| 4,294,220 | 10/1981 | Yasuhara et al. | 123/568 |
| 4,319,453 | 3/1982 | Mann | 60/309 |
| 4,327,188 | 4/1982 | Endo et al. | 501/134 |
| 4,329,162 | 5/1982 | Pitcher, Jr. | 55/523 |
| 4,356,806 | 11/1982 | Freesh | 123/570 |
| 4,373,497 | 2/1983 | Hamren | 123/571 |
| 4,409,947 | 10/1983 | Yanagihara et al. | 123/569 |
| 4,433,666 | 2/1984 | Masaki et al. | 123/571 |
| 4,452,040 | 6/1984 | Kobashi | 60/274 |
| 4,462,379 | 7/1984 | Tsuge et al. | 123/569 |
| 4,466,416 | 8/1984 | Kawamura et al. | 123/571 |
| 4,485,794 | 12/1984 | Kimberley et al. | 123/569 |
| 4,535,588 | 8/1985 | Sato et al. | 60/286 |
| 4,594,993 | 6/1986 | Engel et al. | 123/571 |
| 4,648,373 | 3/1987 | Noguchi et al. | 123/568 |
| 4,672,939 | 6/1987 | Yokoi et al. | 123/568 |
| 4,697,615 | 10/1987 | Tsuchimoto et al. | 137/340 |

(List continued on next page.)

FOREIGN PATENT DOCUMENTS

| | | |
|---|---|---|
| 0121445 | 10/1984 | European Pat. Off. . |
| 213725A | 3/1987 | European Pat. Off. . |
| 0220588 | 5/1987 | European Pat. Off. . |
| 0230140 | 7/1987 | European Pat. Off. . |
| 56-98518 | 8/1981 | Japan . |
| 56-124417 | 9/1981 | Japan . |
| 56-129020 | 10/1981 | Japan . |
| 61-268813 | 11/1986 | Japan . |
| 62-96719 | 5/1987 | Japan . |
| 2064360 | 6/1981 | United Kingdom . |
| 2097283 | 11/1982 | United Kingdom . |

OTHER PUBLICATIONS

Y. Levendis et al., "Development of a Self-Cleaning Particle Trap for Diesel Engine Particulate Control", SAE Technical Paper Series, No. 900601, Feb. 26–Mar. 2, 1990, pp. 195–201.

(List continued on next page.)

Primary Examiner—Douglas Hart
Attorney, Agent, or Firm—Weingarten, Schurgin, Gagnebin & Hayes

[57] ABSTRACT

A diesel engine exhaust gas recirculation system for control of $NO_x$ emissions is disclosed in hi h total particulate (soot, condensed polynuclear aromatic and aliphatic hydrocarbons, and ash) control system is employed to filter the exhaust gas prior to reintroduction to the diesel engine. By cleaning the recirculated exhaust gas of substantially all particulates, wear on the engine due to particulate abrasion is minimized, and $NO_x$ and particulate emissions are reduced. The particulate control system includes a high efficiency ceramic monolith trap that is periodically regenerated by one or more pulses of high-pressure air that move in the opposite direction of the engine exhaust flow through the trap. In one embodiment, a portion of the filtered diesel exhaust is recirculated to the engine. In a further embodiment, the particulate control system filters a portion of the diesel exhaust in the recirculation flow path. The system can retrofit any existing diesel-powered equipment.

44 Claims, 8 Drawing Sheets

U.S. PATENT DOCUMENTS

| Patent # | Date | Inventor | Class |
|---|---|---|---|
| 4,719,751 | 1/1988 | Kume et al. | 60/285 |
| 4,720,376 | 1/1988 | Laue et al. | 423/239 |
| 4,730,454 | 3/1988 | Pischinger et al. | 60/274 |
| 4,787,443 | 11/1988 | Fukatsu et al. | 165/165 |
| 4,833,883 | 5/1989 | Oda et al. | 60/311 |
| 4,835,964 | 6/1989 | Kume et al. | 60/285 |
| 4,875,335 | 10/1989 | Arai et al. | 60/274 |
| 4,924,668 | 5/1990 | Panten et al. | 60/278 |
| 4,935,042 | 6/1990 | Sudo et al. | 55/484 |
| 5,013,340 | 5/1991 | Taslim et al. | 55/290 |
| 5,114,581 | 5/1992 | Goldsmith et al. | 210/650 |
| 5,115,789 | 5/1992 | Aoyama | 123/569 |
| 5,123,243 | 6/1992 | Baddour | 60/274 |
| 5,138,835 | 8/1992 | Bender et al. | 60/278 |

OTHER PUBLICATIONS

K. Takesa et al., "Development of Particulate Trap System with Cross Flow Ceramic Filter and Reverse Cleaning Regeneration", SAE Technical Paper Series, No. 910326, pp. 109–120.

A. Matsunuma et al., "Status of Particulate Trap System for a Heavy Duty Diesel Truck", SAE Technical Paper Series, No. 910132, pp. 29–35.

T. Igarishi et al., "Development of Diesel Particulate Trap Systems for City Buses", SAE Technical Paper Series, No. 910138, pp. 83–92.

Y. Levendis et al., "Evaluation of a Self-Cleaning Particulate Control System for Diesel Engines", SAE Technical Paper Series, No. 910333, pp. 183–193.

"Cellular ceramic products help curb diesel emissions", Automotive Engineering, vol. 100, No. 1, Jan., 1992, pp. 21–25.

Corning "Celcor Dieselfilters", Jun., 1987.

I. Pavlatos, "Emission Control For Diesel Engines", Northeastern University, Aug. 17, 1992, pp. 52–72.

S. Kim et al., "Design of a Diesel Particulate Trap-Incinerator with Simultaneous Filtration and Compressed Air Regeneration (CAR)", SAE Technical Paper Series, No. 930367, Mar. 1–5, 1993, pp. 183–194.

S. Mehta et al., "On-Road Testing of a Reverse Air-Flow Cleaning, Soot-Oxidizing Diesel Particulate Trap System," SAE Technical Paper Series, No. 930368, Mar. 1–5, 1993, pp. 195–211.

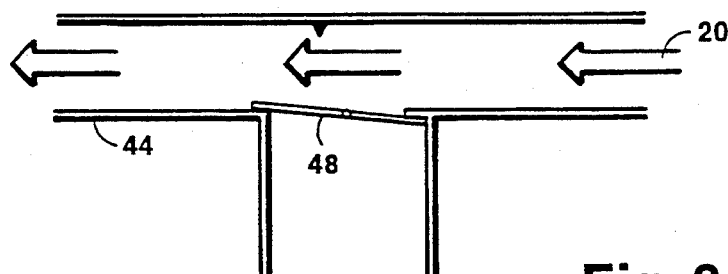
Fig. 3C
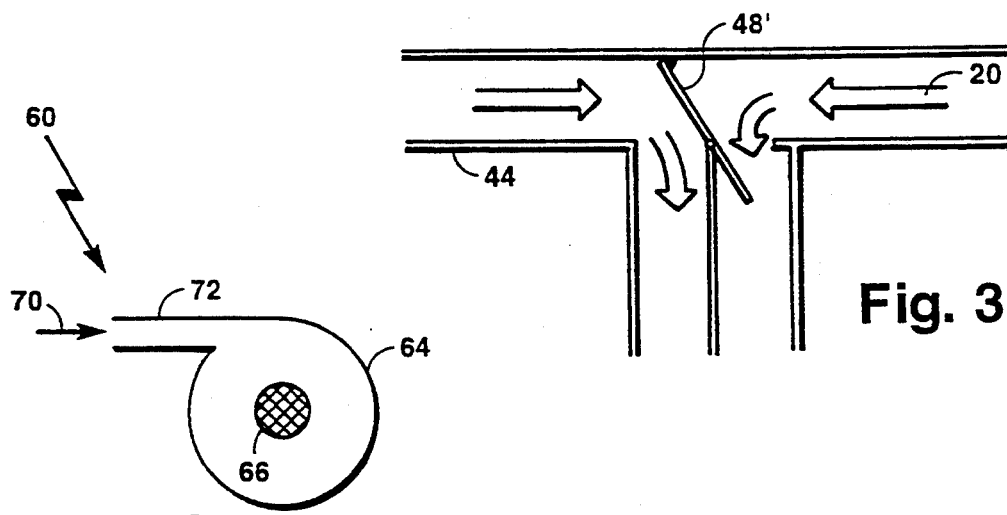
Fig. 3D
Fig. 5A
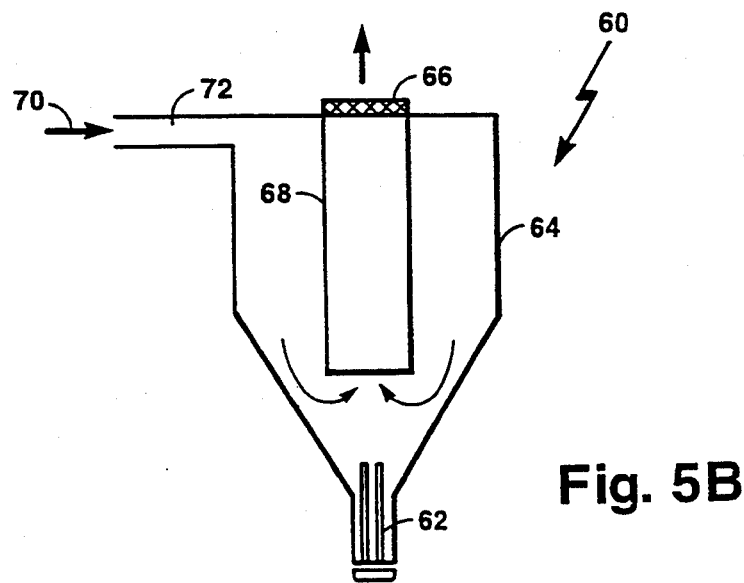
Fig. 5B

DIESEL ENGINE EXHAUST GAS RECIRCULATION SYSTEM FOR $NO_x$ CONTROL INCORPORATING A COMPRESSED AIR REGENERATIVE PARTICULATE CONTROL SYSTEM

RELATED APPLICATION

This application is a continuation-in-part of U.S. patent application Ser. No. 07/839,171, filed on Feb. 21, 1992 now U.S. Pat. No. 5,253,476.

FIELD OF THE INVENTION

This invention is directed to the field of diesel exhaust gas recirculation to control emissions of nitrogen oxides ($NO_x$), and more particularly, to an air pulse regenerated diesel particulate filtration system for a diesel exhaust gas recirculation system.

BACKGROUND OF THE INVENTION

The pollution produced by the exhaust from internal combustion engines is increasingly of concern. These pollutants include hydrocarbon, carbon monoxide (CO), nitrogen oxide ($NO_x$), and particulate emissions. The type and amount of emissions depend, among other things, on the type of engine and fuel system and on operating conditions. For example, diesel engines produce relatively low amounts of CO, but produce significant amounts of particulate matter in the form of soot, that is comprised of carbon, ash, that is comprised of inorganics, and polynuclear aromatic hydrocarbons (PAHs), that are condensed about the carbon nuclei of the soot. $NO_x$ emissions are also a significant problem for diesel engines.

$NO_x$ emissions arise from reactions occurring during the combustion process which involve nitrogen present in the combustion air (atmospheric nitrogen) or, to a lesser extent, bound in the fuel (fuel-bound nitrogen). $NO_x$ formation from atmospheric nitrogen is dependent on the temperature at which combustion occurs. In general, the greater the temperature in the combustion chamber, the greater the resultant $NO_x$ emissions will be. Conversion of fuel-bound nitrogen to $NO_x$ depends on the amount and reactivity of the nitrogen compounds in the fuel and on the amount of oxygen present.

Among other known techniques, exhaust gas recirculation (EGR) has been successfully used to reduce $NO_x$ emissions in the exhaust stream from an engine. With EGR techniques, a portion of the exhaust is recirculated back into the engine. The exhaust gas replaces a portion of the combustion air in the engine, resulting in less oxygen available to enter into the reactions, and lowers the temperature at which combustion occurs. A lower concentration of $NO_x$ emissions in the exhaust gas stream results. Recirculation of ten to fifteen percent of the exhaust gas can lead to a fifty to sixty percent reduction in $NO_x$ emissions.

However, there is a tradeoff between $NO_x$ reduction and particulate emissions. The more air that is displaced by the recirculated exhaust gas, the less $O_2$ is introduced into the engine, which leaves more fuel unburned. Unburned or partially burned fuel increases the concentration of CO and particulate emissions in the exhaust stream. Although CO emissions from diesel engines are relatively low and a small increase caused by EGR can be tolerated, the same is not true of particulate emissions; no increase in particulate emissions of diesel engines is environmentally desirable. In addition, particulates returned to the engine in the recirculated exhaust gas can cause extensive damage. The particulates are abrasive, and get into the engine oil, causing wear on the piston rings, valves, and other parts of the engine. For example, Bender et al., U.S. Pat. No. 5,138,835, discloses a diesel engine exhaust gas recirculation system, but damaging particulates are returned to the engine with the recirculated exhaust gas. Particulates are especially damaging to turbochargers or superchargers. If a diesel engine were equipped with such devices, at least ninety-nine percent of the particulates must be removed if the gas is to be recirculated.

Attempts have been made to filter recirculated diesel exhaust gas. However, these attempts have not fully obviated the problems of preventing engine damage from particulates in the recirculated gas, especially if equipped with a turbocharger or a supercharger, while also reducing $NO_x$ and particulate emissions from the exhaust gas stream. For example, U.S. Pat. No. 4,924,668, to Panten et al., discloses an exhaust gas recirculation system in which a filter for the recirculated gas is placed parallel to the exhaust flow, rather than directly in the recirculation line, to prevent the filter from clogging. However, the exhaust flow out of the vehicle is not filtered at all.

Porous ceramic and other filters have been used to capture unwanted particulate matter in the form of soot, ash, and PAHs condensed about the carbon nuclei of the soot, which are entrained in the emission stream of diesel engines. The soot is "sticky" and adheres quite readily to the walls defining the pores of the ceramic and other filters. However, prior art filters typically have particulate filtration efficiencies of significantly less than 95 percent and typically in the range of 50 to 80 percent; the passage of more than five percent of the particulates through the filter is enough to damage the engine. Also, with the prolongation of filtration, the soot so accumulates in the filters as to obstruct the pores. An obstructed filter induces a back pressure in the exhaust line which can affect engine operation and reduce in the effective throughput of the filters, necessitating the cleaning or replacement of the filters.

Thermal regeneration to remove the accumulated soot from the filters is known, such as by embedding resistive filaments in the ceramic matrix that oxidize the accumulated soot when energized. However, because hot spots tend to be formed thereby that cause thermal failures in the ceramic, not only is care required to prevent degradation of the filter matrix in the locale of the hot spots, but also degraded filters must be periodically monitored to ensure that they comply with the clean air emission standards. Fine ceramic particles can also be eroded and travel downstream, where they can cause damage to the exhaust system piping or to the engine. Further, the PAHs entrained in the diesel exhaust condense at and around 200° to 400° C. Filters which employ thermal regeneration techniques are generally located at the diesel exhaust manifold close to the engine and typically operate at temperatures well above the boiling point of the PAHs, which makes them generally unsuited to unburned PAH emission control or use in a recirculation line. For example, U.S. Pat. No. 4,462,379, to Tsuge et al., discloses a filtered exhaust gas recirculation system using a thermally regenerable filter located close to the engine. See also U.S. Pat. No. 4,356,806, to Freesh, which is directed primarily toward exhaust gas recirculation systems for use with gasoline engines, in which filters are located in the recirculation line close to the engine, where it is possible that filters suitable for filtering diesel exhaust could be damaged by engine heat or thermal regeneration or that PAHs could revolatilize. Moreover, thermally regenerated filters are prone to failure by melting and cracking of the ceramic matrix during the high-temperature regeneration periods.

Another alternative to thermal regeneration of the soot filters is aerodynamic regeneration using pulses of compressed air flowing through the trap in a direction opposite to the exhaust. In commonly assigned U.S. Pat. No. 5,013,340, entitled "Rotating Diesel Particulate Trap", incorporated herein by reference, soot is continuously removed by so rotating a particulate trap that, while one sector thereof is exposed to diesel exhaust flowing in one direction, another sector thereof is exposed to a counter flowing stream of high-velocity (high-mass) air provided either by a fan or a compressed air tank. The filter is rotatably mounted by a bearing assembly and is driven by an electric motor or belt connecting an axle to the drive shaft of the diesel engine whose exhaust is to be filtered, and rotary seals are provided to prevent cross-contamination of the exhaust and cleaning air streams.

SUMMARY OF THE INVENTION

The present invention discloses a diesel engine exhaust gas recirculation system for control of $NO_x$ emissions in which a particulate (soot, condensed polynuclear aromatic and aliphatic hydrocarbons, and ash) control system is employed to filter the exhaust gas prior to reintroduction to the diesel engine. By cleaning the recirculated exhaust gas of substantially all particulates, wear on the engine due to particulate abrasion is reduced, and $NO_x$ and particulate emissions are reduced.

In a first aspect of the present invention, a stationary ceramic diesel soot, ash and PAH trap is disclosed that is maintained at a temperature below the temperature at which heavy hydrocarbons condense, thereby enabling their capture and/or destruction, and that is regenerated by at least one low-duty-cycle high-pressure pulse of air, thereby enabling long-term reverse-flow regeneration without materially depleting the charge of a compressed air tank, and therewith ensuring low power consumption by the regeneration subsystem. By removing ash, soot and condensed hydrocarbons, the present invention enables dirtier fuel to be burned while still meeting the federal clean air standards.

In one embodiment of the first aspect, a single stationary particulate and PAH trap is employed, wherein the diesel exhaust is switched to atmosphere or momentarily stalled (for a fraction of a second) during the on-time of the one or more low-duty-cycle regenerating pulses. In another embodiment, a pair of parallel, stationary particulate and PAH traps are provided, and the diesel exhaust is filtered in one of the traps while the other is being regenerated by one or more low-duty-cycle regeneration pulses. In either embodiment, the one or more low-duty-cycle regeneration pulses can be produced either by gating one or more high-pressure and low-velocity air pulses to the corresponding trap or by so building up pressure in the corresponding trap and gating it as to provide one or more high-pressure pulses of low-duty-cycle. In either embodiment, a controller may be provided either to regenerate the filters periodically or in response to the back pressure in the corresponding trap whenever the back pressure reaches a predetermined pressure level. In an exemplary embodiment, at least one pulse of three-hundred forty-five (345) kPa pressure (approximately 3.5 atm gage) air is applied for one (1) second every thirty (30) minutes to regenerate the stationary particulate soot, ash and PAH trap.

The soot, ash and PAHs collected during pulsed regeneration may be collected by a fiber bag and stored in a baghouse and periodically discarded or burned in a burner or combination cyclone/burner subassembly remotely coupled to the one or more particulate and PAH traps.

The particulate traps employ a high filtration efficiency device such as a cordierite honeycomb filter and/or a mullite corrugation filter, among other particulate traps, and may be provided with a membrane covering the walls defining the pores of the trap.

In a further aspect of the present invention, a regenerable diesel particulate trap such as that disclosed in the first aspect of the present invention is mounted within the exhaust gas flow path from the engine. In particular, the particulate control system employs a filter having a filtration efficiency of at least 95 percent. A suitable filter is a CERAMEM filter which achieves a particulate filtration efficiency of greater than 99 percent, such as that described in U.S. Pat. No. 5,114,581. This filter comprises a ceramic honeycomb monolith in which walls are arranged in parallel to define a honeycomb arrangement of parallel channels. In addition, the walls of the CERAMEM filter are coated with a thin ceramic (approximately 50 micron thick) microfiltration membrane having pores on the order of 0.5 microns. Such fine pores are suitable for trapping soot, which has an aggregate particle diameter in the range of 0.5 to 1 $\mu$m.

In one embodiment, a portion of the diesel exhaust gas which has been filtered by the trap is recirculated to the engine. Periodically, the trap is regenerated by at least one low-duty-cycle high-pressure pulse of air. The dislodged particulates are conducted into a burner or baghouse located below the trap.

In a further embodiment, a ceramic diesel particulate trap is mounted within a recirculation flow path. A portion of the diesel exhaust is conducted to the recirculation flow path and is filtered prior to introduction to the engine. Periodically, the trap is regenerated by at least one low-duty-cycle high-pressure pulse of air, and the dislodged particulates are conducted to the unfiltered exhaust flow path. In either embodiment, a controller may be provided either to control regeneration of the filters periodically or in response to the back pressure in the trap whenever the back pressure reaches a predetermined level.

In an exemplary embodiment, at least one pulse of three-hundred forty-five (345) kPa pressure (approximately 3.5 atm gage) air is applied for one (1) second every thirty (30) minutes to regenerate the particulate trap.

BRIEF DESCRIPTION OF THE DRAWINGS

These and other objects, aspects and features of the present invention will become apparent from the following description of the presently preferred embodiments thereof and from the drawings, wherein:

FIG. 5 illustrates in the FIGS. 5A and 5B thereof top and side views of an electric burner of the diesel particulate and PAH trap in accord with the present invention;

DETAILED DESCRIPTION OF THE PREFERRED EMBODIMENTS

A. Pulsed Regeneration Filtration System

Figure 1:
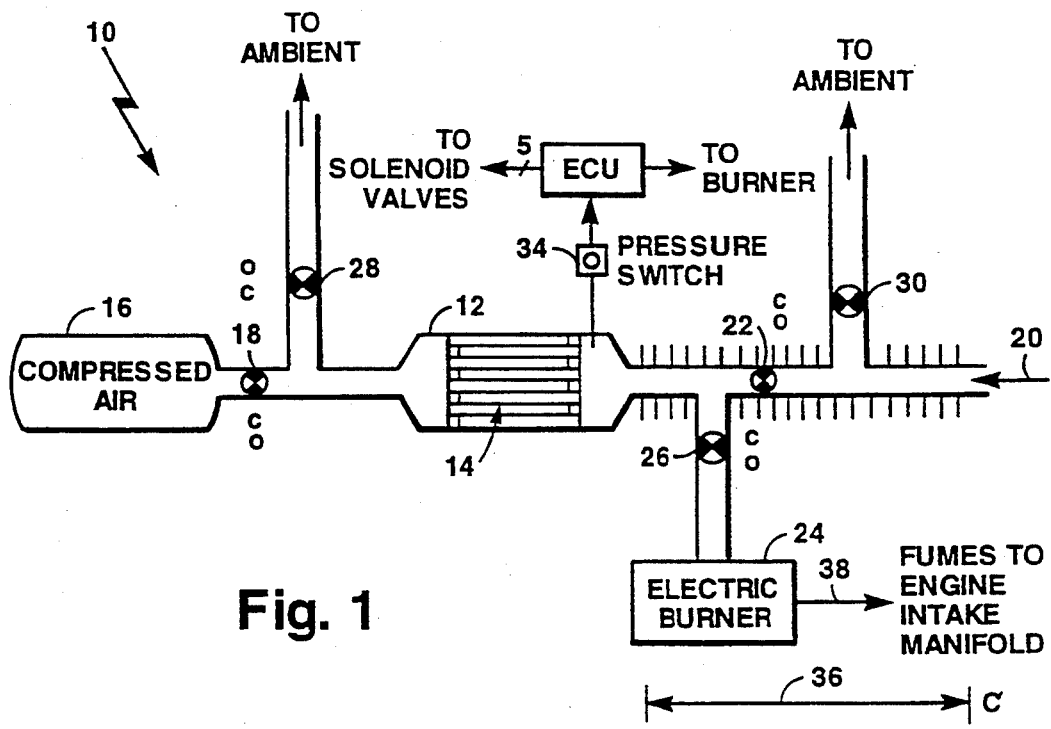
FIG. 1 is a schematic diagram illustrating one embodiment of the diesel particulate and PAH trap in accord with the present invention.

Referring now to FIG. 1, generally designated at 10 is a schematic diagram of one embodiment of the diesel particulate and PAH trap in accord with the present invention. The system 10 includes a casing member 12, such as a steel tube, into which a particulate trap generally designated 14 is rigidly attached, such as by bolted flanges, not shown, in such manner that the trap 14 presents opposing faces that open to either side of the member 12. In the preferred embodiment, two metallic rings, not shown, that fit both sides of the filter 14, hold the filter 14 inside the member 12 using six (6) bolts, not shown, and high-temperature resistant sealing gaskets, such as of red silicone, not shown, are preferably provided between each of the rings and the corresponding face of the filter 14.

The trap 14 may be any suitable diesel particulate and PAH trap, such as ceramic honeycomb monoliths. Exemplary filters that were tested were the NGK C-415 filter with a filtration efficiency of eighty percent (80%); the PANASONIC low-density, light weight R-type mullite fiber ($AL_2O_3$—$SiO_2$) corrugation filter with a filtration efficiency of eighty percent (80%); the CORNING EX-66 with seventy percent (70%) filtration efficiency, and the CERAMEM filter with over ninety-five percent (95%) filtration efficiency. The CERAMEM filter consists of a Corning EX-66 filter coated with a thin (approximately 50 micron) ceramic microfiltration membrane with fine pores (0.5 micron). It may be noted that due to its membrane characteristics, this filter, with its high filtration efficiency, is easily regenerable with back pulsing in a manner to be described, and as a consequence, any possibility for clogging, whether complete or partial, is eliminated.

A compressed air tank 16 is coupled through a valve 18 to one side of the filter 14 disposed in the member 12, and engine exhaust, schematically illustrated by arrow 20, is coupled to the other side of the filter 14 in the member 12 through a valve 22. An electric burner (or bag house) 24 is coupled to the same side of the filter 14 through a valve 26. A valve 28 is provided in a fluid path coupled between the valve 18 and the vessel 12, and a valve 30 is coupled in a fluid path between the engine exhaust 20 and the valve 22. The several fluid valves 18, 22, 26, 28 and 30 are marked by respective indicia "C, O", where the upper such mark indicates either the open (O) or the closed (C) state thereof during normal filtration operation to be described, and where the lower such mark indicates the state thereof during reverse-flow regeneration to be described.

An electronic control unit (ECU) 32 is coupled to the valves 18, 22, 26, 28 and 30, as schematically illustrated by the arrow marked by the number five (5), and is coupled to the burner 24. A pressure responsive switch 34 is coupled between the inside of the member 12 and the electronic control unit 32 to monitor the level of back pressure on the side of the filter 14 that is in communication with the engine exhaust 20. As schematically illustrated by arrow 36, the distance "d" between the diesel exhaust 20 and the member 12 is selected to allow the PAHs and other aliphatic unburnt hydrocarbons-in the diesel exhaust to cool to a temperature below their corresponding boiling point temperature by the time they reach the trap 14. Thus, condensation of the PAHs on the carbonaceous soot is achieved. Cooling fins schematically illustrated by vertical marks 38, or other heat transfer means, may also be provided for this purpose.

Figure 2:
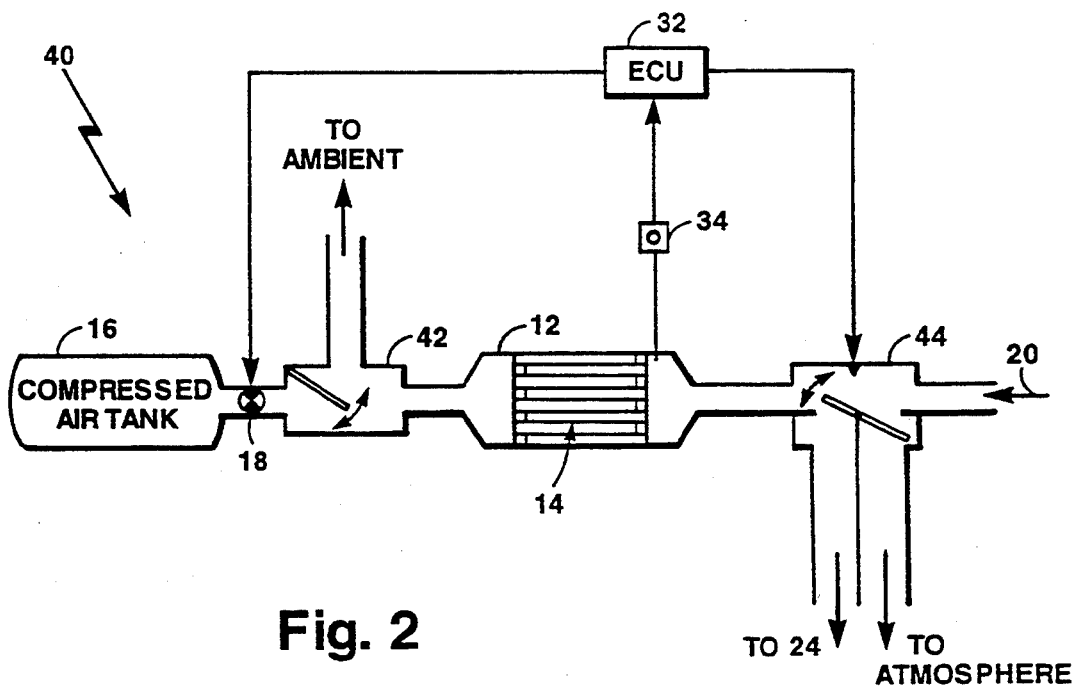
FIG. 2 is a schematic diagram of the embodiment of FIG. 1 illustrating "flip-flap" valves instead of the solenoid valves thereof.

Referring now to FIG. 2, generally designated at 40 is an embodiment of the diesel particulate and PAH trap that uses "flip-flap" valves instead of the solenoid valves of the FIG. 1 embodiment. The embodiment 40 differs from the embodiment 10 of FIG. 1 in the respect that a 3-way "flip-flap" valve 42 is positioned between the solenoid valve 18 and the face of the filter 14 confronting the compressed air tank 16 instead of the solenoid valve 28 (FIG. 1) and in the respect that a 4-way "flip-flap" valve 44 is coupled to the electronic control unit 32 and positioned between the engine exhaust 20 and the face of the trap 14 confronting the engine exhaust 20 instead of the three solenoid valves 22, 26, and 30 of the embodiment 10 of FIG. 1.

Figure 3A:
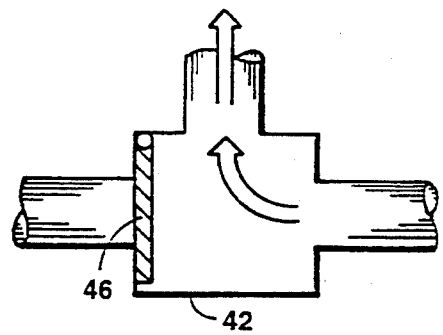
FIG. 3 illustrates in the FIGS. 3A through 3D thereof schematic drawings useful in explaining "flip-flap" valve operation of the diesel particulate and PAH trap in accord with the present invention.
Figure 3B:
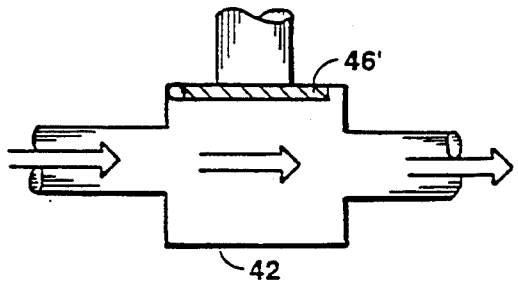

As shown in FIG. 3A, the three-way flip-flap valve 42 has a pivoting flap 46 that is held in the illustrated normal position by gravity during exhaust filtration to be described. During reverse-flow regeneration to be described the pressure of the one or more high-pressure and low-velocity pulses lifts the flap 46 up to the position illustrated at 46' as seen in FIG. 3B to enable each of the one or more pulses to dislodge the PAH-coated soot and ash from the trap 14 in a manner to be described.

As shown in FIG. 3C, the 4-way flip-flap valve 44 has a pivoting double flap 48 that is held by gravity in the normal horizontal position that allows the engine exhaust 20 to flow toward the ceramic filter during normal filtration mode in a manner to be described. During reverse-flow regeneration to be described a solenoid actuator, not shown, lifts the double flap 48 up to the position 48' as seen in FIG. 3D to enable on the one hand the engine exhaust 20 to be diverted either to ambient or to a parallel filter to be described and on the other to enable the soot, ash and PAH laden air stream to be collected in the bag house or to be oxidized in the burner in a manner to be described. It should be noted that the valve 44 may be operated without a solenoid actuator so long as the pressure of each of the one or more high-pressure low-velocity pulses to be described is sufficient to lift the double flap 48 thereof to the position 48' illustrated in FIG. 3D.

Figure 4:
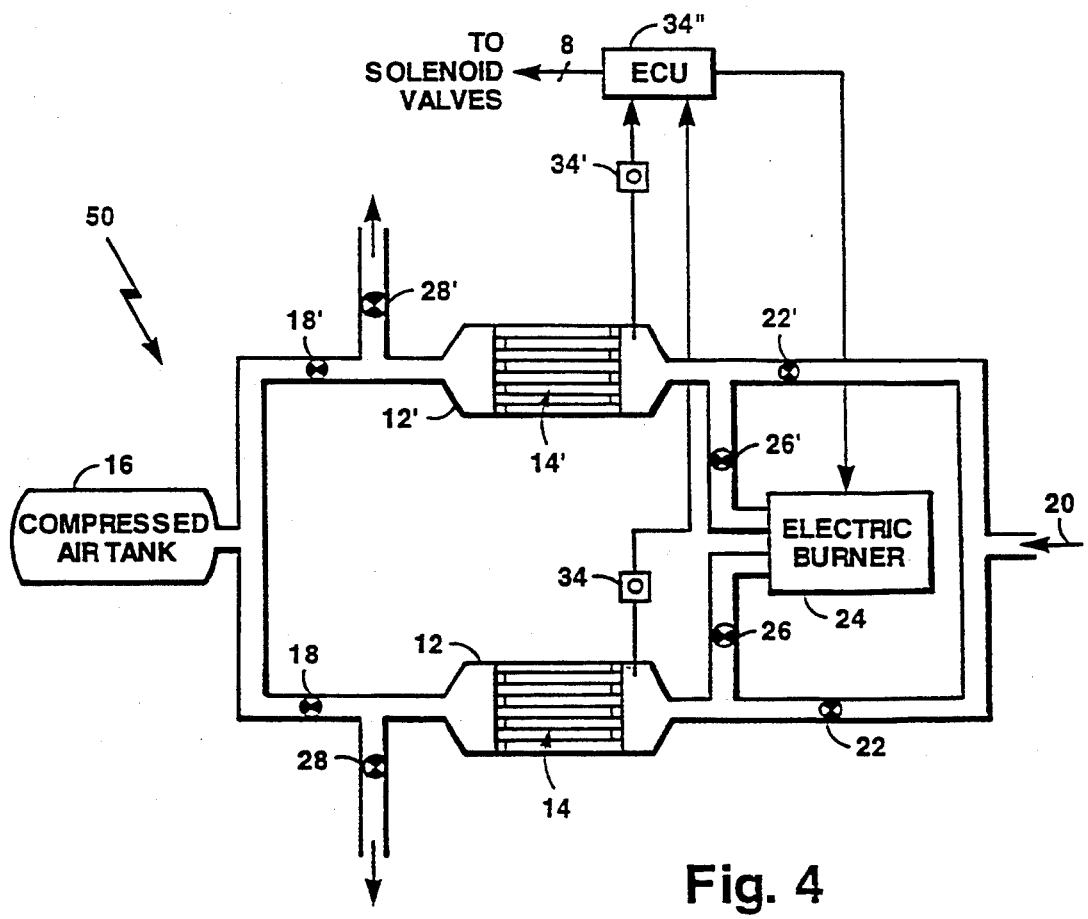
FIG. 4 is a schematic diagram illustrating another embodiment of the diesel particulate and PAH trap in accord with the present invention.

Referring now to FIG. 4, generally designated at 50 is another embodiment of a diesel particulate and PAH trap in accord with the present invention. The embodiment 50 differs from the embodiment 10 of FIG. 1 in the respect that the elements 12, 14, 18, 22, 26, 28 and 34 thereof coupled between the engine exhaust 20 and the compressed air tank 16 are duplicated in parallel by the corresponding elements 12', 14', 18', 22', 26', 28' and 34'; in the respect that the electronic control unit 34" of FIG. 4 is connected to the eight (8) solenoid controlled valves 18, 18', 22 22', 26, 26', 28, 28', rather than the five (5) valves of the embodiment 10 of FIG. 1; and in the respect that the ECU 34" operates differently than the ECU 34 of FIG. 1 to vent in a manner to be described the exhaust 20 alternately through one of the parallel filters 14, 14' while the other is being regenerated rather than by venting the exhaust 20 to ambient as in the embodiment 10 of FIG. 1 (and 40 of FIG. 2). It may be noted that since the FIG. 4 embodiment never vents the diesel exhaust 20 to ambient atmosphere but always filters the same in one of the parallel traps 14, 14', the solenoid valve 30 (FIG. 1) (and the corresponding structure in FIG. 2), that vents the same to ambient atmosphere, is rendered unnecessary in the embodiment 50 of the FIG. 4. It should be noted that as in the embodiment 40 of FIG. 2 where three-way and four-way flip-flap valves may be substituted for the corresponding solenoid valves of the embodiment 10 of FIG. 1, such flip-flap valves may also be substituted in the embodiment 50 of the FIG. 4.

Referring now to FIGS. 5a and 5b, top plan and side sectional views of a presently preferred embodiment of the electric burner device 24 of the embodiments of FIGS. 1, 2 and 4 are illustrated. The burner device 60 consists of an electric heater 62 installed at the bottom of a metallic hopper 64, and a filtering element 66, such as a fabric filter, disposed at an open top mouth of an inner cylinder 68 concentrically disposed within the hopper 64 and axially aligned with the heater 62. An air flow schematically illustrated by an arrow 70 carrying the soot, PAHs and ash induced by pulsed reverse-flow regeneration to be described enters the annular space defined between the outer hopper 64 and the inner cylinder 68 through tangential inlet 72, thereby acquiring a rotating and vortical motion. The vortex flow carrying the soot, PAH and ash descends along the walls of the hopper 64 and then rises in the inner cylinder 68 while still rotating, and exits through the filtering element 66. The soot, ash and PAH particles that accumulate on the walls of the cylinders and the filtering element fall into the hopper and are oxidized by the electric heater 62. In place of the electric burner 60 other electric burners may be employed as well without departing from the inventive concept. A soot collector such as a fabric bag made of Nomex Nylon with a very high capturing efficiency installed in a sealed container could be used as a bag house in place of the electric burner/cyclone subassembly without departing from the inventive concept.

In the normal filtration mode of operation of the single-filter embodiment 10 of the FIG. 1, the exhaust stream 20 from the diesel engine is controllably coupled by the ECU 34 to the soot, PAH and ash trap 14 such that its temperature is below the PAH condensation (boiling point) temperature. As the soot, ash and PAH particulates enter the trap 14, the soot, PAH and ash particulates are captured in the pores of the filter 14 as the exhaust stream 20 is passed therethrough. Downstream of the filter 14, the cleaned exhaust is controllably coupled by the ECU 34 to ambient. In the embodiment of FIG. 1, wherein solenoid valves are employed, the electronic control unit 34 opens the valves 22, 28 respectively leading to the filter 14 and leading away from the filter 14 to ambient to provide the fluid flow path from the engine to ambient while it closes the valves 18, 26, 30 that respectively lead to the pressurized air source 16, the burner device 24, and to the ambient atmosphere. The ECU 34' is operative to provide the same flow paths and connections by means of the valves 42, 44 in the embodiment 40 of FIG. 2.

Figure 6A:
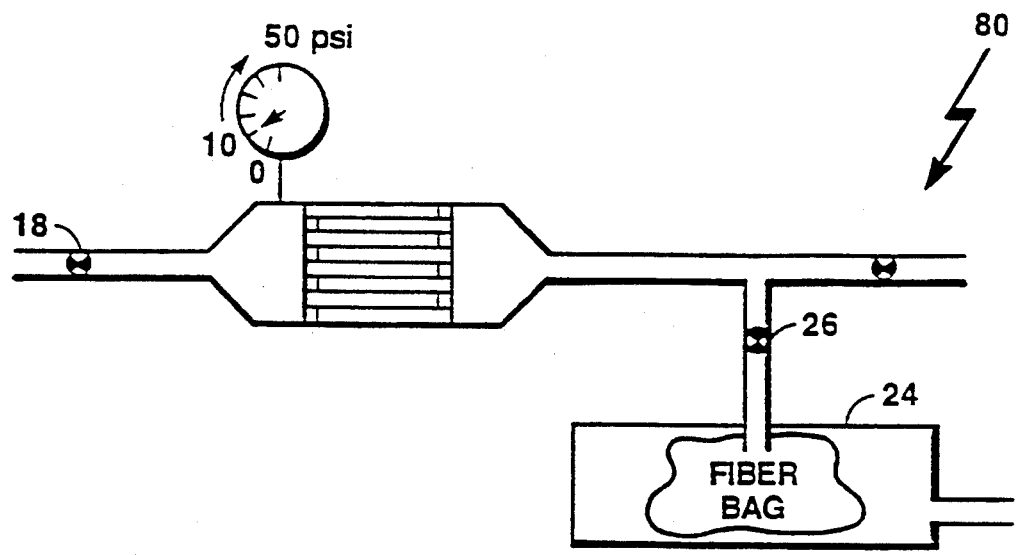
FIG. 6 illustrates in the FIGS. 6A and 6B thereof schematic diagrams useful in explaining one type of regeneration of the diesel particulate and PAH trap in accord with the present invention.
Figure 6B:
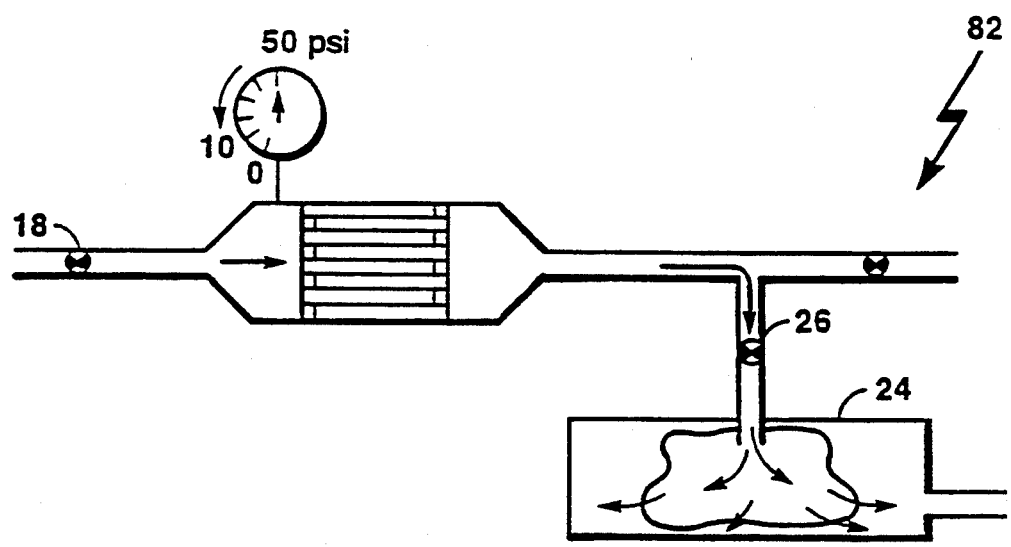

In the reverse-flow regeneration mode of operation of the single-filter embodiment of FIG. 1, the exhaust 20 from the diesel is controllably coupled by the ECU 34 to atmosphere upstream of the filtration element 14 during the time that the filter 14 is being regenerated, at least one pulse of high-pressure and low-velocity (low-mass) air from the compressed air tank 16 is controllably coupled to the side of the filter 14 remote from the diesel exhaust, and the exhaust stream laden with PAH, soot, and ash is controllably coupled to the burner 24. In the embodiment of FIG. 1, wherein solenoid valves are employed, the electronic control unit 34 opens the valves 18, 26 and 30 and closes the valves 22, 28 to provide the flow paths that couple the tank 16 to the member 12, couple the exhaust stream 20 to ambient and the reverse-flow output of the member 12 to the burner 24. The one or more pulses of high-pressure and low-velocity air may be provided from the compressed air tank 16 by controllably opening the solenoid control valve 18 at a low-duty-cycle, for example, about three-tenths (0.3) second each half-hour. Closing the valve 28 to ambient isolates the trap from the outside atmosphere; thus, the air flow upstream of the filter is maintained at a high pressure for the duration of the pulse. The low-duty-cycle of the one or more pulses prevents the consumption of the charge of the air cylinder and ensures the long-life operation of the reverse-flow regeneration subsystem of the invention. The one or more pulses of high-pressure and low-velocity air may also be provided by so controlling the valve 18 at the one end of the filter 14 and the valves 22, 26 at the other side of the trap 14 as to pressurize the member 14 as illustrated generally at 80 in FIG. 6a. When the pressure therein reaches a preselected pressure, the pressure built up in the member 12 is released on a sudden by controllably opening the valve 26 leading to the device 24 (illustrated in FIG. 6 as a collection device) while controllably closing the valve 18 as illustrated generally at 82 in FIG. 6b. In either embodiment, one or more pulses of high-pressure and low-velocity (low-mass) air effectively regenerate the filter 14 dislodging the soot laden with PAHs and ash entrapped therein. The ECU 34 is operative to provide the same flow paths and connects by means of the valves 42, 44 in the embodiment 40.

The embodiment of FIG. 4 operates either by back pulsing or by element vessel pressurization and exhaust (FIG. 6) in the same manner as that of the embodiments of FIGS. 1, 2, except that the exhaust of the diesel is not vented to ambient during pulsed reverse-flow regeneration but rather is controllably coupled by the ECU 34" via valves 22, 22' to one of two or more parallel soot (laden with PAHs) and ash traps 14, 14'; during reverse-flow regeneration of one parallel trap, say the unit 14, the diesel exhaust is fed to the other parallel trap 14', and vice versa The exhaust 20 is then never vented to the ambient atmosphere during pulsed reverse-flow regeneration in the embodiment of FIG. 4. Each leg of the parallel embodiment 50 of FIG. 4 is otherwise operative in normal filtration and reverse-flow regeneration modes as the embodiments 10 and 40 are operative in these modes, and are not again described herein for the sake of brevity of explication.

In any of the embodiments herein, the regeneration can occur periodically, such as every half hour, or can be triggered whenever the pressure reading as provided by the corresponding sensor 34 of the corresponding particulate trap exceeds a predetermined pressure. Exemplary duty cycles of one-half hour to one hour, pressure ranges of three hundred forty-five (345) kPa to five hundred forty-five (545) kPa, and temperature ranges of one hundred seventy-five (175)° C. to one hundred ninety (190)° C. have been found to be effective.

Figure 7A:
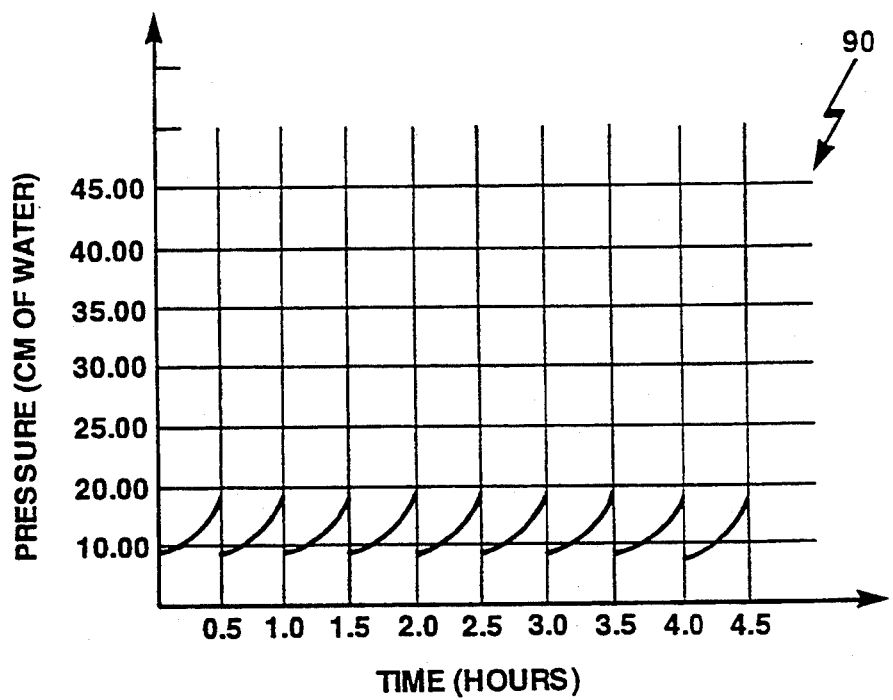
FIG. 7 illustrates in the FIGS. 7A and 7B thereof graphs illustrating the performance of an exemplary embodiment of a diesel particulate and PAH trap in accord with the present invention.
Figure 7B:
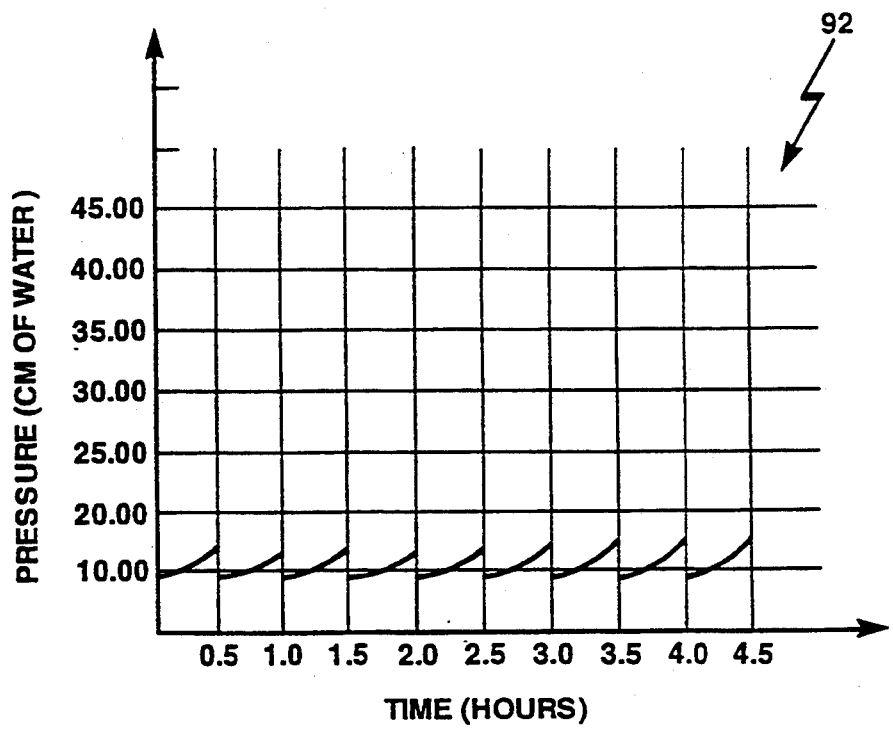

Generally designated at 90 in FIG. 7a and at 92 in FIG. 7b are graphs plotted with pressure as ordinate and time as abscissa that illustrate the performance of the pulsed reverse-flow regeneration subsystem in accord with the instant invention. The graph 90 was compiled from a PANASONIC filter and with regeneration of three (3) pulses at three hundred forty five (345) kPa every half hour and the graph 92 was compiled from a CERAMEM filter using three (3) one (1) second pulses each at three hundred forty five (345) kPa every half hour. As shown by the graphs 90, 92, the pulses effectively removed the soot, PAHs and ash as well from the respective filters.

Figure 8:
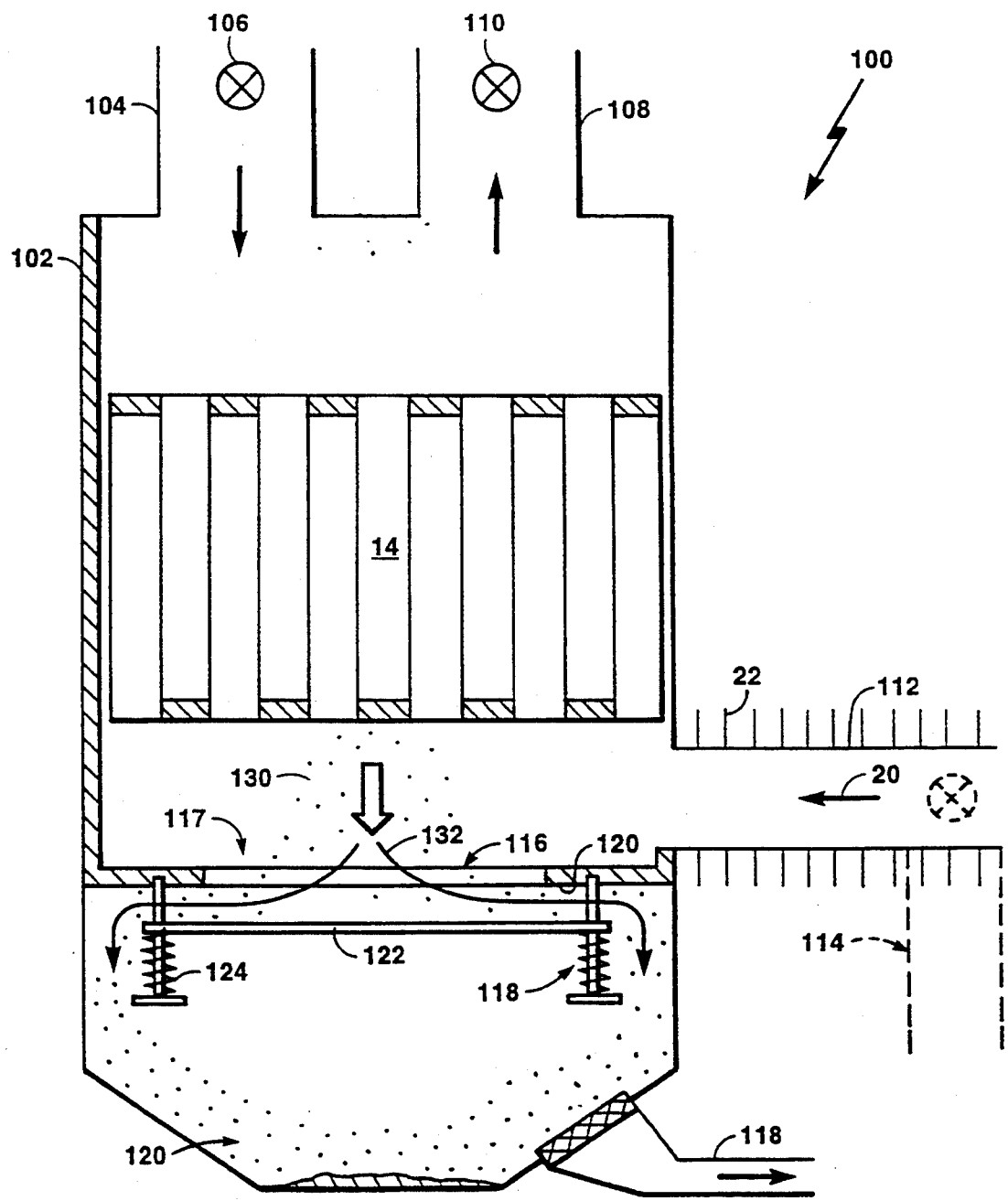
FIG. 8 is a schematic diagram of another embodiment of a pulsed, reverse-flow regenerated diesel trap capturing soot, ash and PAHs in accord with the present invention.

Referring now to FIG. 8, generally designated at 100 is a schematic diagram of another embodiment of the pulsed, reverse-flow regenerated diesel trap capturing soot, PAHs and ash in accord with the present invention. The system 100 differs from the single-filter embodiments heretofore in as much as the trap housing is vertical, not horizontal, in the respect that engine exhaust is fed through the trap during reverse-flow regeneration and in the respect that the burner subassembly is included in the same vertical housing as the trap. The embodiment 100 includes the ceramic filter 14 mounted in housing 102 having a top face and a bottom face. Any suitable mounting means, such as bolted flanges that hold both sides of the filter 14 inside the housing 102 with high-temperature resistant sealing gaskets, both not shown, are preferably provided between the housing 104 and each face of the trap 14.

A first conduit 104 connected to the top of the housing 102 is coupled to a compressed air source, not shown, via a solenoid valve shown schematically at 106, and an exhaust conduit 108 is coupled to ambient via solenoid valve illustrated schematically at 110. Both the conduits 104, 108 open to one face of the trap 14.

A conduit 112 is coupled between engine exhaust schematically illustrated by arrow 20 and the member 102, which conduit opens to the other face of the trap 14.

In an alternative embodiment shown dashed generally at 114, three-way solenoid valve and a conduct that communicates with the diesel exhaust conduit may be provided to vent the diesel exhaust to ambient as in the embodiments heretofore.

Floor generally designated 116 having central opening generally designated 117 is provided in the housing 102 below the trap 14, and a pressure-responsive door assembly generally designated 118 is mounted to the floor 116 in such wise that the opening 117 is closed by the door subassembly 118 during normal filtration mode, but is open during reverse-flow regeneration to allow dislodged particulates to be collected in burner device generally designated 120 mounted to the bottom of the member 102.

The door assembly 118 includes a door 122 end mounted on springs 124 that resiliently bias the door 122 against O-ring subassembly 126 provided on the confronting face of the floor 114.

The burner device 120 may be a coil heater or flame, like propane, butane and the like. A conduit 128 is provided off the combustion region of the burner that is coupled back to the engine intake to burn any PAHs that are revolitized during the combustion process.

Any suitable door assembly 122 may be employed, such as a center-opening door that opens in response to the pressure of the high-pressure and low-velocity regeneration pulses, or an electronically-actuated door, without departing from the inventive concept.

In operation, during normal filtration mode, the valves 106, 110 are controllably actuated by the electronic control unit, not shown, to couple the engine exhaust through the filter and out the engine exhaust output conduit 108; the conduit 104 is held closed by closing the valve 106, while the trap door 122 is held closed by action of the springs 124.

During reverse-flow regeneration, the engine exhaust is coupled to the filter (or alternatively to ambient via solenoid actuated valve 114), the conduit 108 is held closed by closing the valve 110, and the conduit 104 is opened by opening the valve 106.

During reverse-flow regeneration, high-pressure and low-velocity pulses of the type described hereinabove are controllably coupled through the reverse-flow regeneration conduit 104 through the filter 14, which pulses dislodge the accumulated particulates therewithin as schematically illustrated by matrix 130, while the exhaust is being fed therethrough. The pressure of the low-duty cycle, high-pressure and low-velocity pulses acts against the bias provided by the springs 124 and moves the door 122 into its opened condition, whereby the dislodged particulates 130 are forced around the door and are moved into the burner device as schematically illustrated by arrows 132. During the particulate burning process, the conduit 128 couples any PAHs that may revolitize back to the engine, thereby ensuring that they get burned again and absorbed so that no vapors are released to the atmosphere.

It will be appreciated that a conduit may be coupled off the burner device to enable the other embodiments herein to burn revolitized hydrocarbons. It will also be appreciated that engine exhaust may be coupled through the traps of the other embodiments herein during reverse-flow regeneration in alternative embodiments thereof. It will also be appreciated that flip-flop valves may be employed in lieu of the solenoid valves of the embodiment of FIG. 8.

B. Filtered Exhaust Gas Recirculation

Figure 9:
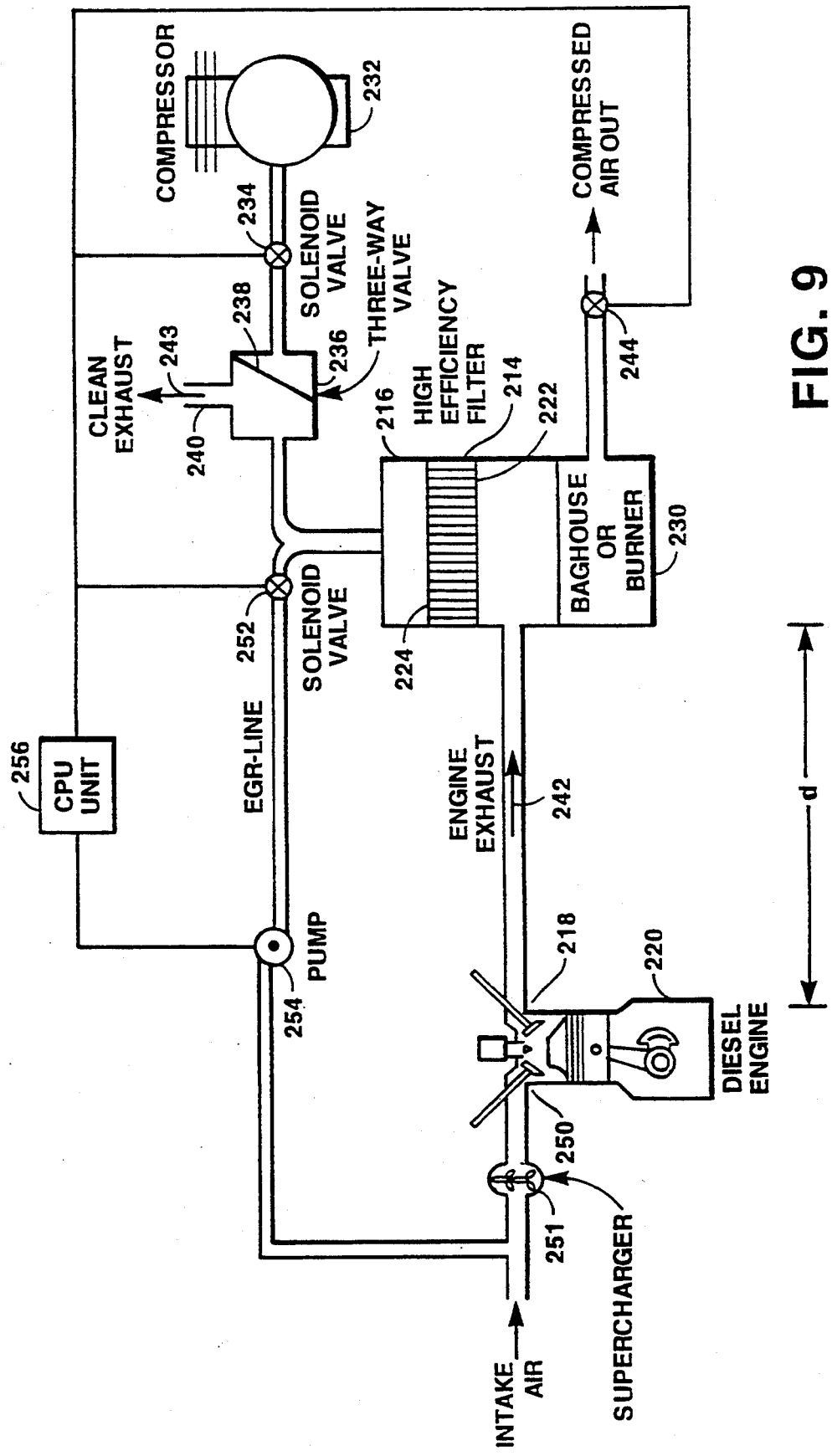
FIG. 9 is a schematic diagram illustrating an embodiment of a filtered exhaust gas recirculation system in accord with the present invention.

FIG. 9 schematically illustrates an embodiment of a filtered exhaust gas recirculation system for a diesel engine in accordance with the present invention. The system includes a filter 214 rigidly attached in a casing 216 which is rigidly attached within an exhaust gas flow path leading from an exhaust gas outlet 218 of a diesel engine 220. The face 222 of the filter 214 is oriented to receive the exhaust gas flow from the engine. As schematically illustrated in FIG. 9, the distance "d" between the diesel exhaust and the filter 214 may be selected to allow the PAHs and other aliphatic unburnt hydrocarbons in the diesel exhaust to cool to a temperature below their corresponding boiling point temperature by the time they reach the filter. Thus, condensation of a fraction of the volatile hydrocarbons on the carbonaceous soot is achieved.

The filter 214 comprises a diesel particulates and volatile hydrocarbon trap having a particulate filtration efficiency of at least 95 percent and preferably at least 99 percent. If exhaust gas is recirculated to an engine equipped with a turbocharger or supercharger at the intake of the compressor, at least 99 percent of the particulates must be removed, since the particulates are excessively destructive to such devices. The previously described CERAMEM filter is a suitable filter, which achieves a 99 percent efficiency. This filter comprises a ceramic honeycomb monolith, as previously described, in which walls are arranged in parallel to define a honeycomb arrangement of parallel channels. One end of each channel is blocked, adjacent channels being blocked at opposite ends, such that gas entering the open ends of one set of channels must pass through the pores in the walls to exit the open ends of the adjacent channels. In addition, the walls of the CERAMEM filter are coated with a thin ceramic (approximately 50 micron thick) microfiltration membrane having pores on the order of 0.5 microns. Such fine pores are suitable for trapping soot, which has an aggregate particle diameter in the range of 0.5 to 1 $\mu$m. In this manner, the CERAMEM filter functions as a surface filter, in which particles are trapped on the surface of the walls, rather than as a depth filter, in which particles become embedded within the walls. Particles on the wall surfaces are more easily removed by aerodynamic regeneration than particles embedded in the walls.

Returning to FIG. 9, a compressed air source 232 is coupled through a solenoid valve 234 to the opposing face 224 of the filter 214 remote from the engine exhaust gas outlet 218. Buses and trucks are frequently equipped with an air compressor, which may serve as the source of compressed air in the present invention. A three-way valve 236, such as a flip-flap valve, is coupled in the flow path between the air compressor 232 and the filter 214. A hinged flap 238 operates to alternately close off the flow path to the air compressor 232 or the outlet 240 to ambient.

During operation in the filtration mode, the engine exhaust from the engine exhaust outlet 218, schematically illustrated by arrow 242, is directed through the filter 214, in which the particulates are deposited. The flap 238 of the three-way valve 236 is positioned by gravity to close off the flow path between the air compressor 232 and the three-way valve and open the flow path to ambient via the outlet 240, schematically illustrated by arrow 243. The solenoid valve 234 is closed, so that no compressed air enters the system.

A burner or other collection device 230 is coupled to the face 222 of the filter 214 and is preferably included within the same casing 216 as the filter, as indicated with respect to the embodiment of FIG. 8, described previously. In this embodiment, the filter casing 216 is preferably mounted vertically with respect to the engine exhaust. A pressure responsive door assembly is mounted in the filter casing below the filter, as shown with more particularity in FIG. 8. During operation in the filtration mode, the door assembly is biassed closed, but the door assembly opens in response to the flow of air from the compressor during reverse-flow regeneration to allow dislodged particulates to be collected in the collection device. The compressed air is exhausted to ambient during the reverse-flow regeneration mode via a solenoid valve 244 which is closed during the filtration mode.

A recirculation or EGR line 248 is located with an upstream entrance in the exhaust line between the face 224 and the three-way valve 236. The recirculation line has a downstream exit at the engine intake manifold 250, or at a supercharger 251 or turbocharger (not shown) if the engine is so equipped. A solenoid valve 252 is located near the upstream end of the line to control the amount of clean gas admitted to the EGR line. A pump 254 may be provided in the EGR line to pressurize and regulate the flow, if necessary, as is known in the art. The length of the recirculation line between the filter and the engine intake and the location of the EGR line upstream entrance is selected to cool the recirculated gas to a lower temperature, preferably in the range of 20° to 40° C., prior to its introduction to the engine. A cooler gas is denser, and more gas can thereby be recirculated into the engine for more efficient $NO_x$ reduction.

A central processor unit (CPU) 256 is coupled to the valves 234, 244, and 252 and to the pump 254. A pressure responsive switch as previously described by reference to FIGS. 1, 2, and 4 may be coupled between the inside of the casing 216 and the CPU to monitor the level of back pressure on the side 222 of the filter 214 that is in communication with the engine exhaust.

In operation during the filtration mode, the exhaust stream 242 from the diesel engine 220 is directed to and through the particulate filter 214. As the particulates enter the filter, the particulates are captured in the pores of the filter walls or membrane coating as the exhaust stream passes therethrough. Downstream of the filter 214, the cleaned exhaust gas is coupled to ambient via the three-way valve 236 to the pressure of the exhaust gas flow on the flap 238 to close off the flow path to the compressed air source, while the valve 234 for the compressed air source is closed under the control of the CPU. Additionally, a portion of the cleaned exhaust gas is controllably directed out of the exhaust line into the recirculation line 248 through the valve 252 under the control of the CPU. Tests have shown that ten percent recirculation leads to a reduction in the $NO_x$ emissions of approximately forty percent. A fifteen percent recirculation rate leads to approximately a sixty percent reduction in $NO_x$ emissions. A twenty percent recirculation rate leads to approximately an eighty percent reduction in $NO_x$ emissions. Typically, approximately ten to fifteen percent of the cleaned exhaust gas is directed to the recirculation line. A greater percentage of the cleaned exhaust gas may be directed into the recirculation line if desired. However, recirculation rates of greater than fifteen or twenty percent begin to effect engine performance significantly.

In the reverse flow regeneration mode of operation, at least one pulse of high-pressure air from the compressed air source is controllably coupled to the side 224 of the filter remote from the diesel exhaust. The one or more pulses of high-pressure air may be provided from the compressed air source 232 by controllably opening the solenoid control valves 234 and 244 and closing the valve 252 in the EGR line at a low-duty-cycle, for example, about three-tenths (0.3) second each half-hour, to provide a flow path that couples the compressed air source to ambient via the filter 214 and the collection device 230. The pulse of air is sufficient to move the hinged flap 238 of the three-way valve to close off the outlet 240 to ambient, thereby allowing the pressure to build up evenly across the face 224 of the filter. The pulse of air passes down and through the filter 214, dislodging the particles therein, and impinges on the door assembly of the collection device (see FIG. 8) to open the door. The dislodged particles are retained in the collection device. The low-duty-cycle of the one or more pulses prevents the consumption of the charge of the air cylinder and ensures the long-life operation of the reverse-flow regeneration subsystem of the invention.

Additionally, it is generally not necessary to close off the exhaust stream 242 from the engine 220 or couple the exhaust stream to ambient. By locating the collection device directly below the filter and opening the valve 244 to ambient, the pulse of air is directed toward the collection device through the door assembly thereof, rather than toward the engine. Also, for a pulse of a short duration, such as 0.3 second, the backpressure in the line from the engine does not significantly affect engine operation. However, valves closing off the flow from the engine or directing the exhaust to ambient, such as valves 22 and/or 30 of FIG. 1 as previously described, may be provided if desired.

Filtering recirculated exhaust gas according to the present invention thus obviates problems of engine wear due to contamination of the lubricating oil with soot. The benefits of EGR can be realized, and reduction of particulate emissions can be achieved as well. In addition, corrosion problems in the intake manifold are minimized, since sulfates are also partially removed in the trap by condensation on the soot. Also, the pulsed regeneration system is highly reliable since is does not rely on thermal regeneration of the ceramic filter which can lead to high temperature failures of the ceramic by melting or cracking.

Figure 10:
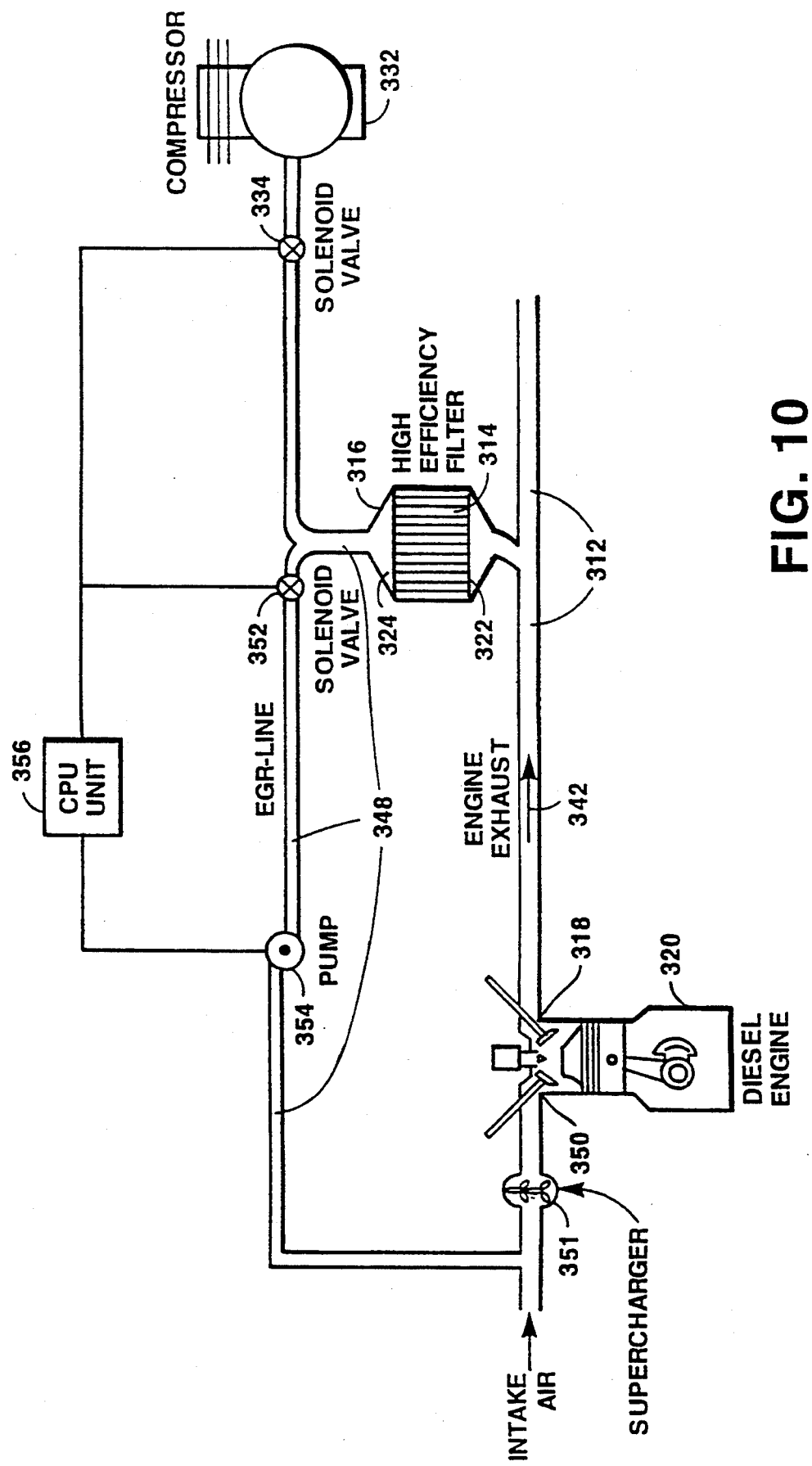
FIG. 10 is a schematic diagram illustrating another embodiment of the filtered exhaust gas recirculation system in accord with the present invention.

Referring now to FIG. 10, a schematic diagram of another embodiment of the filtered exhaust gas recirculation system of the present invention is shown. An exhaust gas flow path 312 extends from a diesel engine 320. A recirculation or EGR line 348 branches from the exhaust gas flow path at a location downstream of the engine 320. The downstream end of the recirculation line communicates with the engine intake manifold 350, or supercharger 351 or turbocharger (not shown) if the engine is so equipped. A solenoid valve 352 in the EGR line controls the amount of gas flow on the EGR line. A pump 354 is also provided in the EGR line to pressurize and regulate the flow, as is known in the art. The length of the recirculation line and the location of its upstream entrance in the exhaust gas line is selected to cool the recirculated exhaust gas to a lower temperature, preferably in the range of 20° to 40° C., prior to its introduction to the engine.

A filter 314, rigidly attached in a casing 316, is located in the EGR line 348 near the upstream end thereof with opposing faces 322, 324 in line with the recirculation exhaust gas flow. The filter comprises a diesel particulates and PAH trap having a filtration efficiency of $\geq 95\%$. The CERAMEM filter previously described is capable of providing such a high filtration efficiency. As schematically illustrated in FIG. 10, the distance from the engine 320 to the face 322 is selected to allow the PAHs and other aliphatic unburnt hydrocarbons in the diesel exhaust to cool to a temperature below their corresponding boiling point temperature by the time they reach the filter. Thus, partial condensation of the volatile hydrocarbons on the carbonaceous soot is achieved.

A compressed air source 332 is coupled via a solenoid valve 334 to the face 324 of the filter 314 disposed in the line 348. A central processor unit (CPU) 356 is coupled to the valves 334 and 352 and the pump 354. A pressure responsive switch may be coupled between the inside of the casing 318 and the CPU to monitor the level of the backpressure on the side 322 of the filter 314 that is in communication with the engine exhaust.

In operation during the filtration mode, the exhaust stream, schematically indicated by arrow 342, is directed into the exhaust gas flow path 312. A portion of the exhaust gas stream is controllably diverted into the recirculation line 348, where the flow is passed to and through the particulate filter 314. Valve 334 is closed. As the particulates enter the filter, the particulates are captured in the pores of the filter as the exhaust stream passes therethrough.

In the reverse flow regeneration mode of operation, the valve 352 in the EGR line is closed and the valve 334 is opened and at least one pulse of high-pressure air from the compressed air tank is controllably coupled to the side 324 of the filter 314 remote from the engine outlet. The one or more pulses of air effectively regenerates the filter by dislodging the particulates entrapped therein. Additionally, the distance between the face 322 of the filter 314 and the flow path 312 is selected to be sufficiently small so that the pulse of air readily delivers the entrapped particulates into the exhaust gas flow line. This embodiment is suitable for applications where control of particulates is not required but $NO_x$ reduction is desired, and in applications which would nevertheless generate sufficient particulates to damage the engine if recirculated with the unfiltered exhaust gas.

In any of the embodiments herein, the regeneration can occur periodically, such as every half hour, or can be triggered whenever the pressure reading as provided by a pressure sensor associated with the corresponding particulate filter exceeds a predetermined pressure. Exemplary duty cycles of one-half hour to one hour and pressure ranges of 3.0 to 6.0 atm (gage) have been found to be effective. Also, although the valves have been described as solenoid or flip-flap valves, any other suitable valves may be provided.

Many modifications of the presently disclosed invention will become apparent to those skilled in the art having benefitted from the instant disclosure without departing from the inventive concept.

We claim:

1. A system for reducing nitrogen oxide ($NO_x$) and total particulate emissions in diesel exhaust from a diesel engine comprising:

a diesel engine exhaust gas flow path having a diesel exhaust inlet port couplable to a diesel engine and a diesel exhaust outlet port couplable to ambient;

a regenerable filter having pores sized to capture particles therewithin that are contained in the diesel exhaust, said filter located downstream of said diesel exhaust inlet;

said filter having a filtration efficiency of at least ninety-five percent;

means for directing at least a portion of the diesel engine exhaust flow through said filter;

means comprising a recirculation flow path for controllably recirculating at least a portion of said filtered diesel engine exhaust flow to the diesel engine;

said recirculation flow path between said regenerable filter and said diesel engine having a preselected length selected to cool the recirculated diesel exhaust; and means for regenerating said filter at periodic intervals by providing at least one pulse of compressed air to remove said particulates lodged in said filter.

2. The invention of claim 1, wherein said regeneration means comprises:
a source of compressed air controllably coupled to said diesel engine exhaust gas flow path between said filter and said diesel exhaust outlet port; and
a controller, operatively coupled to said source of compressed air and operable to provide at least one pulse of high-pressure air from said source of compressed air that flows through said filter in a direction that dislodges soot (laden with PAH) and ash particles that are lodged within the pores thereof and that moves the soot (laden with PAH) and ash particles out of said filter.

3. The invention of claim 2, wherein said regeneration means further comprises:
a particulate disposal unit coupled to said diesel engine exhaust gas flow path between said filter and said inlet port, whereby dislodged soot (laden with PAH) and ash particles are moved into said disposal unit.

4. The invention of claim 1, wherein said regeneration means comprises:
a source of compressed air controllably coupled to said filter downstream of the diesel engine exhaust flow through said filter; and
a controller, operatively coupled to said source of compressed air and operable to provide at least one pulse of high-pressure air from said source of compressed air that flows through said filter in a direction that dislodges soot (laden with PAH) and ash particles that are lodged within the pores thereof and that moves the soot (laden with PAH) and ash particles out of said filter.

5. The invention of claim 1, wherein said controllably recirculating means further comprises:
a recirculation control valve coupled to said recirculation flow path; and
a controller, operatively coupled to said recirculation control valve and operable in a filtration mode to open said valve for coupling diesel exhaust in said diesel exhaust gas flow path through said filter and along said recirculation flow path, and further operable in a regeneration mode to close said valve to decouple diesel exhaust from said recirculation flow path.

6. The invention of claim 1, wherein said means for directing at least a portion of the diesel engine exhaust flow through said filter comprises a control valve coupled downstream of said filter, and a controller operatively coupled to said control valve to open and close said control valve, whereby at least a portion of the diesel engine exhaust flow is directed through said filter in response to said control valve.

7. The invention of claim 1, wherein said means for directing at least a portion of the diesel engine exhaust flow through said filter comprises disposing said filter in said diesel engine exhaust gas flow path, whereby exhaust on said flow path flows through said filter.

8. The invention of claim 1, further comprising a rigid casing disposed in said diesel engine exhaust flow path, said regenerable filter being mounted within said casing.

9. The invention of claim 1, wherein said filter is a CERAMEM filter.

10. The invention of claim 1, wherein said pores of said filter are sized to trap particles having an aggregate particle diameter of 0.5 to 1 $\mu$m.

11. The invention of claim 1, wherein said filter has a filtration efficiency of at least ninety-nine percent.

12. The invention of claim 1, wherein said diesel exhaust gas flow path between said inlet port and said regenerable filter has a preselected length selected to allow entrained PAH particles sufficient time to cool to below their decomposition temperature by the time the particles reach said filter along said diesel exhaust gas flow path.

13. A diesel engine exhaust gas recirculation and filtration system for reducing nitrogen oxide ($NO_x$) and total particulate emissions in diesel exhaust from a diesel engine comprising:
a diesel engine exhaust gas conduit having a diesel exhaust inlet port couplable to a diesel engine and a diesel exhaust outlet port couplable to ambient;
a regenerable filter having pores sized to capture particles therewithin that are contained in the diesel exhaust, said filter disposed in said diesel engine exhaust conduit between said diesel exhaust inlet port and said diesel exhaust outlet port;
a recirculation conduit having an upstream inlet coupled to said diesel engine exhaust conduit between said filter and said outlet port, said recirculation conduit further having a downstream outlet coupled to an inlet to the diesel engine, a recirculation control valve being further located downstream of said filter in said recirculation conduit near said upstream inlet of said recirculation conduit;
a source of compressed air controllably coupled to said diesel engine exhaust gas conduit between said filter and said diesel exhaust outlet port;
a particulate disposal unit coupled to said diesel engine exhaust gas conduit between said filter and said inlet port; and
a controller, operatively coupled to said source of compressed air and said recirculation control valve in said recirculation conduit, operable in a filtration mode for coupling diesel exhaust in said diesel exhaust gas conduit through said filter and directing a portion of filtered exhaust gas to said recirculation conduit and a remainder portion of filtered exhaust gas out said diesel exhaust output port, and further operable in a regeneration mode to provide at least one pulse of high-pressure air from said source of compressed air that flows through said filter in a direction that dislodges soot (laden with PAH) and ash particles that are lodged within the pores thereof and that moves the soot (laden with PAH) and ash particles into said disposal unit.

14. The invention of claim 13, further comprising an air inlet valve coupled to said source of compressed air and in communication with said controller for gating said air inlet valve to provide said at least one pulse.

15. The invention of claim 14, further comprising an air outlet valve coupled downstream of said collection device and in communication with said controller for gating said air outlet valve synchronously with said air inlet valve to provide a flow path for said at least one pulse of high pressure and low velocity air through said filter and said collection device.

16. The invention of claim 15, wherein said valves comprise solenoid valves.

17. The invention of claim 13, further including means for insuring that the temperature of said filter is below the decomposition temperature of selected unburnt hydrocarbons.

18. The invention of claim 13, wherein the portion of said diesel exhaust conduit between said diesel exhaust inlet port and said filter has a preselected length selected to allow entrained PAH particles sufficient time to cool to below their decomposition temperature by the time they reach said filter along said diesel exhaust flow path.

19. The invention of claim 13, further including heat transfer means mounted along the portion of said diesel exhaust conduit defined between said diesel exhaust inlet port and said filter.

20. The invention of claim 13, wherein said filter has a particulate filtration efficiency of at least ninety-five percent.

21. The invention of claim 13, wherein said filter has a particulate filtration efficiency of at least ninety-nine percent.

22. The invention of claim 13, wherein said filter is a CERAMEM filter.

23. The invention of claim 13, wherein said pores of said filter are sized to trap particles having an aggregate particle diameter of 0.5 to 1 $\mu$m.

24. The invention of claim 13, wherein said high-pressure pulses are selected from a range of pressures of 3.0 to 6.0 atm.

25. The invention of claim 13, wherein said low-duty-cycle is from one half to one hour.

26. The invention of claim 13, wherein said recirculation control valve is in further communication with said controller for gating said control valve to close said recirculation conduit during said regeneration mode.

27. The invention of claim 13, further comprising a pump coupled to said recirculation conduit downstream of said recirculation control valve.

28. The invention of claim 13, further comprising a three-way valve coupled between said filter and said source of compressed air, said three-way valve operable to direct cleaned exhaust gas to said diesel exhaust outlet port during said filtration mode and operable to close said diesel exhaust outlet port and to direct the air from said source of compressed air to said filter during said regeneration mode.

29. The invention of claim 13, wherein said three-way valve comprises a flip-flap valve.

30. The invention of claim 13, further comprising a casing rigidly coupled within said diesel engine exhaust gas conduit, wherein said filter and said disposal unit are rigidly mounted vertically within said casing with said disposal unit located below said filter, whereby dislodged soot laden with PAH and ash particles are directed into said disposal unit.

31. The invention of claim 13, further comprising a closure between said filter and said disposal unit, said closure being biassed closed during said filtration mode and openable upon pressure exerted by said at least one pulse during said regeneration mode, whereby dislodged soot laden with PAH and ash particles are carried through said opened closure into said disposal unit.

32. A diesel engine exhaust gas recirculation and filtration system for reducing nitrogen oxide ($NO_x$) and total particulate emissions in diesel exhaust from a diesel engine, comprising:
an unfiltered diesel exhaust inlet port;
an unfiltered diesel exhaust gas flow path defined by an exhaust gas line coupled between said inlet port and ambient;
a recirculation flow path defined by a return line having an upstream inlet located along said unfiltered exhaust gas flow path and a downstream outlet couplable to an inlet to the diesel engine;
a filter having pores sized to capture particles therewithin that are contained within the diesel exhaust;
a recirculation control valve located in said recirculation flow path downstream of said filter;
a source of compressed air controllably coupled to said recirculation flow path;
a controller operatively coupled to said source of compressed air and said recirculation control valve, said controller being operative in a filtration mode for coupling a part of diesel exhaust along said unfiltered exhaust gas flow path through said filter along said recirculation flow path and to the engine intake and further operative in a regeneration mode for providing at least one pulse of high-pressure air that flows through said filter along said regeneration flow path in a direction that dislodges the soot (laden with PAH) and ash particles that are lodged within the pores in said filter during operation in said filtration mode and that moves the soot (laden with PAH) and ash particles into said unfiltered exhaust gas flow path.

33. The invention of claim 32, further comprising a valve coupled to said air compressor and where said controller is in communication with said valve for gating said valve to provide said at least one pulse.

34. The invention of claim 33, further comprising a pump located in said recirculation flow path downstream of said recirculation control valve.

35. The invention of claim 32, wherein said filter is located sufficiently close to said unfiltered exhaust gas flow path to allow substantially all of the dislodged soot (laden with PAH) and ash to be moved into said unfiltered exhaust gas flow path by said at least one pulse of high-pressure air.

36. The invention of claim 32, further including means for ensuring that the temperature of said filter is below the decomposition temperature of selected unburnt hydrocarbons.

37. The invention of claim 36, wherein said filter is located sufficiently distant from said unfiltered diesel exhaust inlet port to allow entrained PAH particles sufficient time to cool to below their decomposition temperature by the time they reach said filter along said unfiltered exhaust gas flow path.

38. The invention of claim 36, wherein said ensuring means includes heat transfer means mounted along the portion of said unfiltered exhaust gas flow path and the portion of said recirculation flow path between the unfiltered diesel exhaust inlet port and said filter.

39. The invention of claim 32, wherein said filter has a filtration efficiency of at least ninety-five percent.

40. The invention of claim 32, wherein said filter has a filtration efficiency of at least ninety-nine percent.

41. The invention of claim 32, wherein said filter is a CERAMEM filter.

42. The invention of claim 32, wherein said pores of said filter are sized to trap particles having an aggregate particle diameter of 0.5 to 1 µm.

43. The invention of claim 32, wherein said high-pressure pulses are selected from a range of pressures of 3.0 to 6.0 atm.

44. The invention of claim 32, wherein said low-duty-cycle is from one half to one hour.

* * * * *

UNITED STATES PATENT AND TRADEMARK OFFICE
CERTIFICATE OF CORRECTION

PATENT NO. : 5,426,936
DATED : June 27, 1995
INVENTOR(S) : Yiannis A. Levendis et al.

It is certified that error appears in the above-indentified patent and that said Letters Patent is hereby corrected as shown below:

In the ABSTRACT, line 2, "in hi h total" should read --in which a total--.

Column 9, line 11, "vice versa The" should read --vice versa. The--.

Signed and Sealed this

Sixteenth Day of April, 1996

Attest:

BRUCE LEHMAN

Attesting Officer     Commissioner of Patents and Trademarks